United States Patent [19]

Sadr et al.

[11] Patent Number: 5,662,842
[45] Date of Patent: Sep. 2, 1997

[54] PROCESS FOR BLOW MOLDING HOLLOW OBJECTS WITH INDEPENDENT MOVEMENT OF MOLD HALVES

[75] Inventors: Changize Sadr, Toronto; Roger Elgner, Woodbridge, both of Canada

[73] Assignee: Salflex Polymers Ltd., Weston

[21] Appl. No.: 276,581

[22] Filed: Jul. 18, 1994

[51] Int. Cl.⁶ .......................... B29C 49/04; B29C 49/56
[52] U.S. Cl. .................. 264/40.5; 264/531; 425/532; 425/541
[58] Field of Search ...................... 264/515, 531, 264/540, 40.5; 425/150, 155, 525, 532, 541

[56] References Cited

U.S. PATENT DOCUMENTS

| | | | |
|---|---|---|---|
| 4,026,983 | 5/1977 | Stockwell | 264/531 |
| 4,239,474 | 12/1980 | Nakagawa. | |
| 4,285,658 | 8/1981 | Bohart. | |
| 4,362,688 | 12/1982 | Nakagawa. | |
| 4,645,447 | 2/1987 | Sumitomo | 264/531 |
| 4,659,531 | 4/1987 | Ezaki | 264/515 |
| 4,738,612 | 4/1988 | Kikuchi et al.. | |
| 4,865,799 | 9/1989 | Sadr | 264/540 |
| 5,037,289 | 8/1991 | Ohta et al. | 425/532 |
| 5,122,327 | 6/1992 | Spina. | |
| 5,250,238 | 10/1993 | Kiefer. | |
| 5,264,178 | 11/1993 | Yamamura et al. | 264/531 |

FOREIGN PATENT DOCUMENTS

| | | |
|---|---|---|
| A0 248 306 | 12/1987 | European Pat. Off.. |
| 3737453 A1 | 5/1988 | Germany. |
| 61-072519 | 4/1986 | Japan. |
| 61-079617 | 4/1986 | Japan ............ 264/540 |
| 61-021126 | 5/1986 | Japan ............ 264/531 |
| 62-297133 | 12/1987 | Japan ............ 264/531 |
| 935560 | 8/1963 | United Kingdom. |

OTHER PUBLICATIONS

Kunststoffe, vol. 83, No. 9, 1 Sep. 1993, Komplexer Formteile.

Vol 6. No. 157—Patent Abstracts of Japan JP57072825—Hitachi.

Vol. 11 No. 388—Patent Abstracts of Japan—156924—Kyoraku.

Vol. 004 No. 154—Patent Abstracts of Japan—105538—Hitachi.

Vol. 009 No. 087—Patent Abstracts of Japan—214626—Nihon Purasuto.

Primary Examiner—Catherine Timm
Attorney, Agent, or Firm—Bereskin & Parr

[57] ABSTRACT

In a blow molding process the mold halves are independently controlled and moved so that a parison may be extruded from an extrusion head and then one of two mold halves may be moved toward the parison. The parison may be grasped by a manipulator to manipulate a portion of the parison so as to overlie a second portion of the mold cavity. The mold is then closed and a standard blow molding procedure performed. The process enables production of reduced flash.

18 Claims, 6 Drawing Sheets

PROCESS FOR BLOW MOLDING HOLLOW OBJECTS WITH INDEPENDENT MOVEMENT OF MOLD HALVES

FIELD OF THE INVENTION

The present invention relates to an apparatus and method for molding plastic articles. The method and A apparatus is particularly suited for forming items of complicated configuration.

In typical blow molding methods and apparatus a thermal plastic resin such as thermo plastic polyolefins or the like is extruded to form a parison. The parison which is a hollow structure is then enclosed in a mold. The mold comprises two sections, each section having a cavity therein. When the sections are brought into contact with each other the sections of the mold form a closed cavity. The interior of the parison is then subjected to pressure and the moldable plastic article then assumes the configuration of the mold cavity to produce a hollow closed article.

When manufacturing simple articles such as straight pipe or even straight pipe with corrugated sections using blow molding techniques, there is relatively little waste in forming the product. In these simple shapes it is relatively easy to extrude a parison of the size to be contained within the cavity within the closed mold. The blowing pressure is then applied and virtually the entire parison is used to form the desired end article. When more convoluted shapes are required problems of excess material use then arise.

If the cavity in the mold is more complicated then it may be that in order to extrude a parison large enough to overlie all of the mold cavity so that the entire cavity is filled with thermoplastic material on closing of the molds, there will be excess plastic material. The use of excess material is objectionable for two quite separate reasons. Use of excess material is itself wasteful and adds unnecessarily to the cost of the final product. Another problem, however, which occurs with use of excess material is that the finished product must then be separated from the excess material. The trimming of the finished product involves further manufacturing steps and serves only to increase the cost of production while serving no other useful function. Accordingly, it has long been realized that it is desirable to produce products without any excess. This is some times referred to as "flashless molding". The term "flash" is often used to describe the excess material which is left over during the molding process but is not otherwise a desired or necessary part of the finished product.

U.S. Pat. No. 4,239,474, Nakagawa, issued Dec. 16, 1980, is an example of an apparatus to deal with the problem of reducing flash. In the Nakagawa patent one of the mold halves is referred to as a lower mold half and is arranged to lie in a substantially horizontal position. The face of the mold which contains a groove to formpart of the mold cavity faces upward. An extrusion nozzle for discharging a parison is located above the lower mold half. The relative positional relation between the nozzle and the lower mold half is changed during the extrusion stage in such as manner that the nozzle follows the groove in the first mold half without changing the distance between the nozzle and the groove so that a parison can be placed in the groove of the lowermost half. After the parison is laid within the groove then the upper mold half is closed to form the closed mold and a typical blow molding process is then completed by pressurizing the interior of the parison. Nakagawa suggests that either the nozzle may remain stationery and means are provided to move the mold through all of the X, Y and Z directions, or that the mold remains stationery and means are provided so that the nozzle may move through all of the X, Y and Z directions. This patent thus requires relatively complicated equipment to move either the nozzle or the mold half in order to have the parison placed in the groove of the mold.

In the Nakagawa patent the parison is laid in one mold half and the second half or upper half of the mold is then brought into position against the lower half of the mold. More typically in blow molding operations the mold halves move toward each other in a substantially horizontal direction. With such arrangements the nozzle for the ejector is often arranged vertically above the mold halves and a parison is produced by ejection from the nozzle of thermoplastic material. The thermoplastic material may hang from the nozzle under the effect of gravity. The mold halves are then moved in from either side to engage the parison and close before molding pressure is applied to the interior of the preform or parison. Typically there is a general plane of reference which lies directly under the nozzle. In the simplest form of blow molding the mold halves will close with each mold half having a similar cavity depth and the mold halves will close approximately on the reference plane. Deviation one way or the other from the reference plane may be acceptable depending upon the nature of the product to be produced. This may be the case particularly where the cavities in the two mold halves are not necessarily mirror images of one another. Typically, however, the mold halves are closed together at the same time and in synchronization with one another.

U.S. Pat. No. 5,250238 to Kiefer et al, issued Oct. 5, 1993, illustrates a variation on a mold closure system. In the Kiefer patent the two mold halves are synchronically linked to close together. A second freedom of movement is provided by a second operator which moves the entire mold. In the simplest case the mold may close by moving the mold halves together in a horizontal direction. With the second operator the mold itself may be moved horizontally. The combination of the two degrees of movement then provides an asymmetric closing and/or opening movements to the mold halves relative to the parison. In order to achieve this asymmetric closing and opening the mold is displaced as an entirety parallel to the direction of the opening and closing movements. In Kiefer the first degree of movement between the mold halves is maintained synchronous. This may be done byway of a mechanical linkage. Alternatively, if separate hydraulic cylinders and rams are used to control the position of the mold halves, then a fixed amount of hydraulic fluid is delivered to the mold closing mechanism to ensure that the movements of the mold portions relative to each other remain unaffected, that is, synchronized. Kiefer teaches that the total feed amount of the hydraulic operating fluid be determined and then divided up so that the opening and closing movements of the mold portions relative to each other remain unaffected by the displacement of the blow mold as a whole. Kiefer further indicates that it would be inappropriate to adopt an arrangement in which separate drive means for each mold portion has its own valve and/or its own regulating circuit as in such a configuration, particularly in the last phase of the closing operation, two regulating circuits relative to the general reference plane would not achieve the appropriate closing forces or could do so only at extremely high cost because it is not possible to make a clear separation in terms of functions between closing and opening of the blow molding mold on the one hand and displacement of the mold on the other hand.

In accordance with the present invention a process for making a blow molded product comprises the steps of extruding a parison from an extrusion head so that the parison hangs from the extrusion head substantially vertically. First and second complimentary mold halves are independently controlled. The mold halves are moved independently of each other from a mold open position to a mold closed position. The parison is grasped at least one first portion in a manipulator and the portion of the parison grasped is manipulated after a second portion of the parison is contacted by one of the mold halves. Thereafter the mold halves are closed over the parison to create a closed mold and blow molding of the parison produces a product in the closed mold.

DESCRIPTION OF THE DRAWINGS

A preferred embodiment of the present invention is described below with reference to the accompanying drawings in which.

Figure 1:
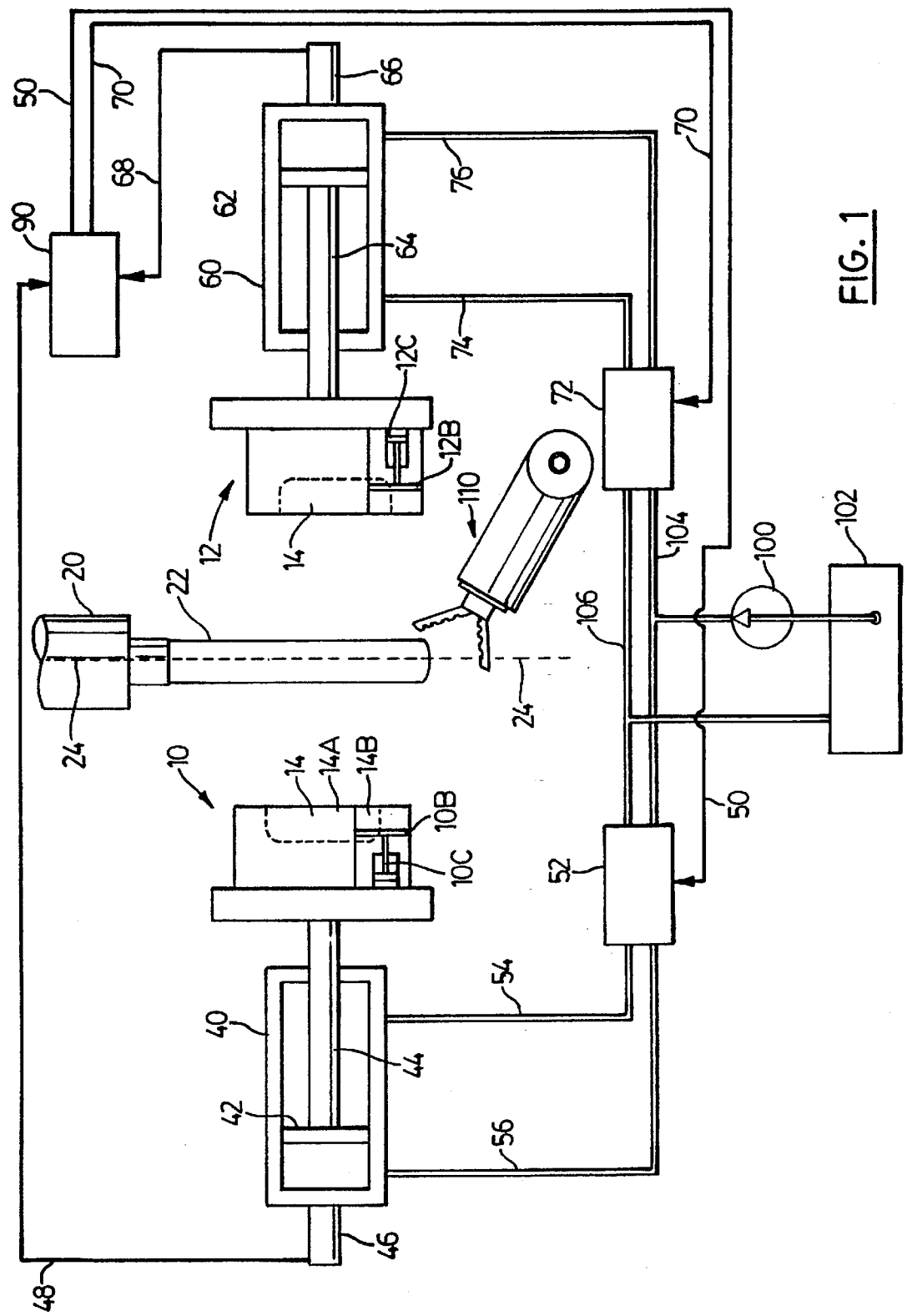
FIG. 1 is a schematic diagram illustrating an apparatus which utilizes the process of the current invention.

The apparatus illustrated in FIG. 1 comprises complimentary mold halves 10 and 12. The term mold halves is used in this description and claims to refer to complimentary mold portions. At least one of the mold halves or portions will comprise a cavity 14. The other mold half or portion may also contain some form of cavity 14. The two cavities, however, may not necessarily be of the same configuration. The two mold halves are complimentary in the sense that when they close, the cavities comprise a closed internal cavity which defines the exterior surface configuration of the molded part. In the typical blow molding process, when the cavity is closed, air or other gas is introduced under pressure to the interior to the parison and the thermoplastic material is forced against the perimeter of the cavity to assume the final configuration of the molded product. As the thermoplastic material cools, it retains its shape and the mold portions open and the completed part is expelled from the mold.

As shown in FIG. 1, the blow molding process typically involves a nozzle 20. The nozzle 20 is connected to an extruder device in which the thermoplastic. material is prepared ready for extrusion through the nozzle 20. In typical blow molding process the nozzle 20 is configured to produce a hollow tubular parison which upon extrusion from the nozzle 20 will hang vertically downwardly from the nozzle 20. A parison 22 is shown in FIG. 1.

There is a general plane of reference indicated by the dotted line 24 in FIG. 1. This general line of reference lies substantially centrally under the nozzle 20 and will substantially bi-sect the parison.

In a typical blow molding process the mold halves are brought together to close with the complimentary mold surfaces contacting each other generally in the vicinity of the plane of reference 24. However, when manufacturing more complicated shapes and in particular when manufacturing shapes that may extend substantially in three dimensions, problems of excess material are encountered.

With the parison hanging from the nozzle 20 as shown in FIG. 1, it would be relatively easy to make a standard tubular material such as a hose. If the part to be molded were to have a bellows section, then it would not be difficult to simply contour the molds and close the molds on the hanging parison. On the other hand, if the part was more convoluted and included a tubular run that was substantially perpendicular to the plane of FIG. 1, then some other mechanism or process would be required to have the thermoplastic material extend outwardly from the plane of FIG. 1. One way of doing this would be to extrude a very large parison from the nozzle 20 so that the parison overlaid all of the mold cavity. When the mold halves are closed then there will be thermoplastic material overlying all of the cavity. Unfortunately, there will also be thermoplastic material well outside the cavity and such a procedure would produce a product having very substantial flash. As previously indicated a product with substantial flash is not desirable as there is not only a waste of thermoplastic material but also the necessity of trimming the flash.

While the mold halves 10 and 12 shown in FIG. 1 are shown as relatively simple molds, for most parts the cavity may be relatively complicated in configuration. In order to place an extruded parison 22 within the mold cavity 14, there is often a significant advantage in having one of the mold halves 10 or 12 first contact the parison before the other half of the mold contacts the parison. With a portion of the parison in contact with one of the mold halves, the mold half and parison can be controlled so as to direct the remainder of the parison into contact with the remainder of the cavity.

In order to independently control the mold halves, each mold half is independently positioned and moved between mold open and mold closed positions. The mold halves 10 and 12 are positioned by hydraulic cylinders 40 and 60 respectively. Hydraulic cylinders 40 and 60 contain a hydraulic piston 42 and 62 respectively. Each hydraulic piston 42 and 62 is connected to a hydraulic ram 44 and 64 respectively. The hydraulic rams 44 and 64 are fixed directly to the mold halves 10 and 12 respectively or to mold platens if desired. Independent movement of the hydraulic pistons 42 and 62 independently controls the position of the mold halves 10 and 12 with respect to each other or the plane of reference 24.

Each of the hydraulic cylinders 40 and 60 is fitted with mold position sensing means 46 and 66 respectively. The mold position sensing means shown diagrammatically are indicative of the location of the pistons 42 and 62 within the cylinder which is in turn indicative of the location of the mold halves 10 and 12 with respect to the general plane of reference 24.

A programmable controller 90 receives signals from position indicators 46 and 66 through connections illustrated as 48 and 68 respectively. The programmable controller 90 sends signals through connections 50 and 70 respectively to hydraulic valves 52 and 72 which control the flow of hydraulic fluid to hydraulic cylinders 40 and 60 respectively. The hydraulic control valves 52 and 72 respectively supply and exhaust hydraulic fluid to either side of the pistons 42 or 62 respectively through hydraulic lines 54 and 74 and hydraulic lines 56 and 76.

A pump 100 supplies hydraulic fluid from a reservoir 102 through supply header 104 to control valves 52 and 72 respectively. Control valves 52 and 72 are fitted with hydraulic return header 106 which returns fluid to the reservoir 102.

From reference to FIG. 1 it will be noted that by operation of the programmable controller 90, either of the mold halves 10 and 12 may be positioned independently. With the pump 100 operating, hydraulic fluid is supplied under pressure, through supply header 104 to control valves 52 and 72. If it is desired that mold half 12 be moved then a signal is generated from the programmable controller 90 through connection 70 to control valve 72. The control valve 72 may be positioned to direct the flow of hydraulic fluid through conduit 76 into the chamber of hydraulic cylinder 60 thus moving the piston to the left in FIG. 1. At the same time, fluid will be exhausted from the hydraulic cylinder 60 through conduit 74, through the control valve 72 and into the return header 106. This can be accomplished without any movement, whatsoever, of the complimentary mold half 10.

Similarly mold half 10 may be controlled by means of programmable controller 90 sending signals through connection 50 to control valve 52 and moving the piston 42 as desired. The precise location of piston 42 or piston 62 is determined by the programmable controller by means of the feedback loop comprising the position sensors 46 and 66 and the input connections 48 and 68. Thus, the programmable controller 90 has feedback means to at all times determine the position of the mold halves.

The mold designer is thus free to program the controller 90 to independently control the mold halves to move the mold halves as desired.

In order to make a blow molded part of more complex configuration the apparatus shown in FIG. 1 also comprises a parison manipulator 110. The parison manipulator 110 shown in FIG. 1 comprises a pair of members which close like scissors which can grasp a portion of a parison. The manipulator is mounted on a manipulator arm which can be controlled to move as desired. The manipulator may move the parison so that the portion grasped moves perpendicular to the plane of FIG. 1 or in the plane of FIG. 1 or at any angle to the plane of FIG. 1.

Figure 3:
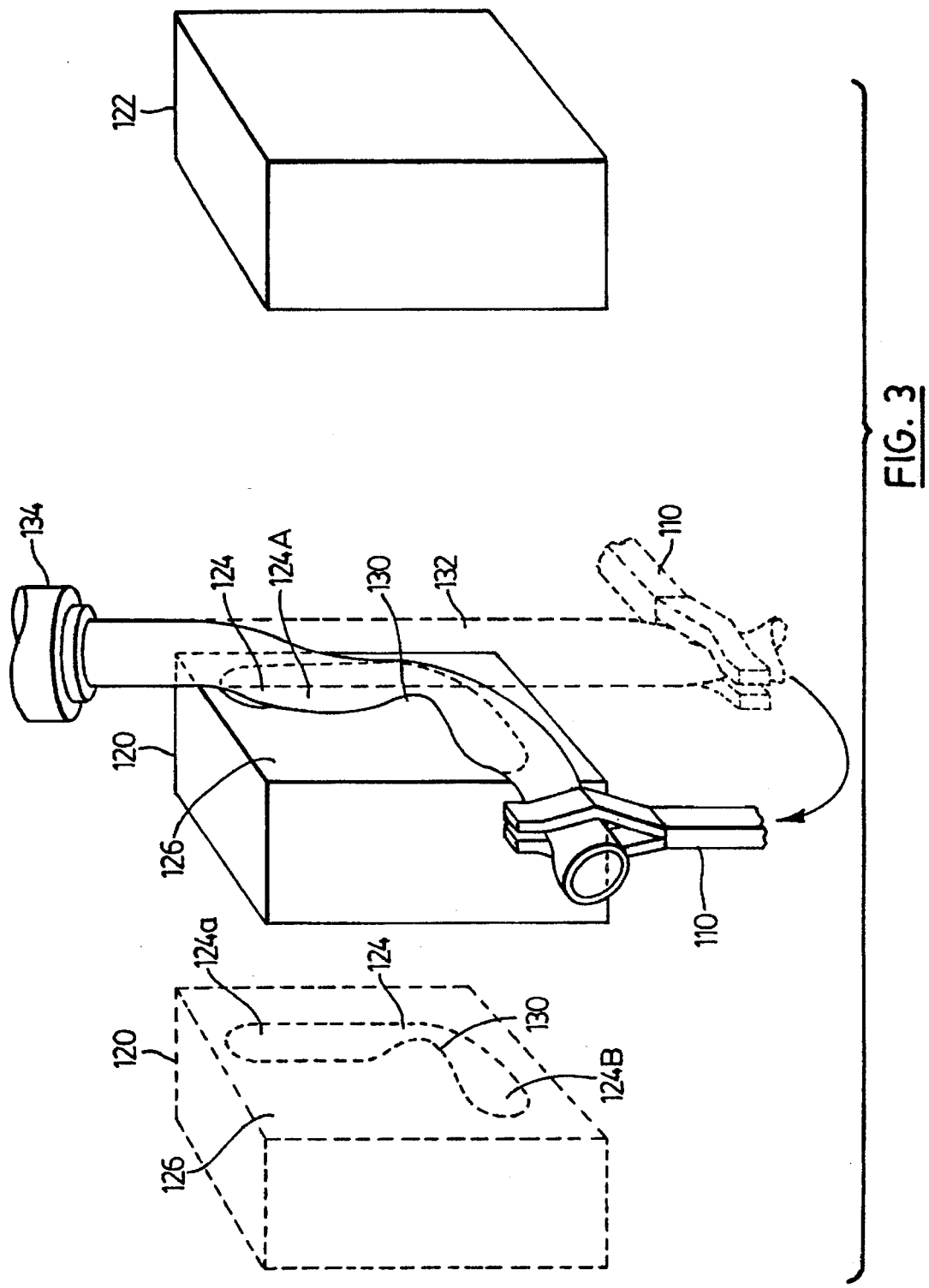
FIG. 3 illustrates a form of mold half which may be advantageously used with the invention.

To further illustrate and explain the process of this invention reference may now be had conveniently to FIG. 3. FIG. 3 illustrates a mold half 120. The initial location of mold half 120 is shown in broken lines and the final position is shown in solid lines. The mold half 120 includes a cavity 124 which defines a portion of the exterior surface of a part to be blow molded. The mold portion 120 comprises a face 126 herein referred to as the parting face. The parting face 126 of the mold half 120 is the face which will contact a similar parting face of the complimentary mold half to form a closed cavity. The mold half parting face 126 in a very simple mold may be substantially planar. However, in many cases the parting face 126 is not necessarily a planar face and may be quite complex as required by the part to be made. In the mold half 120 illustrated in FIG. 3, the parting face 126 of mold 120 includes a projecting portion 130. The projecting portion 130 projects outwardly of what is otherwise a relatively planar surface 126. FIG. 3 shows the mold 120 ready for use with complimentary mold half 122.

The mold portion as shown in FIG. 3 is particularly useful with the process of this invention. When the mold half 120 is utilized, a parison can be extruded to hang vertically as shown in dotted lines in FIG. 3. In this view, the parison 132 is shown hanging vertically from a nozzle 134. When the parison 132 is in that configuration, the mold half 120 is moved substantially horizontally toward the parison so that the parison overlies the aligned portion 124A of the mold cavity 124. A manipulator 110 as shown in FIG. 1 may then be used to grasp the parison 132 adjacent the lower end portion and manoeuvre the lower portion of the parison. In this case the manipulator would move that portion of the parison 132 through a 90° angle. The initial position of the manipulator is shown in broken lines and the moved position is shown in solid lines. The projecting portion 130 on the parting face 126 of the mold serves to retain the remainder of the parison 132A aligned with the portion of mold cavity 124A with which it was aligned during the extrusion process. When the lower portion of the parison has been manipulated to be aligned with portion 124B of cavity 124, the parison would then overlie the entire cavity 124. With the parison in that configuration, the complimentary mold half 122 may be moved toward mold half 120 until the mold halves contact one another along the parting face 126, thus forming a closed cavity 124. When the parison located within the cavity 124 is blown under the typical blow molding pressures, because the parison is located entirely within the cavity 124, there is almost no excess flash produced. The only flash or excess material will be that required to accommodate the blow tube used in the typical blow molding process and a small portion immediately adjacent the manipulator 110.

Figure 4:
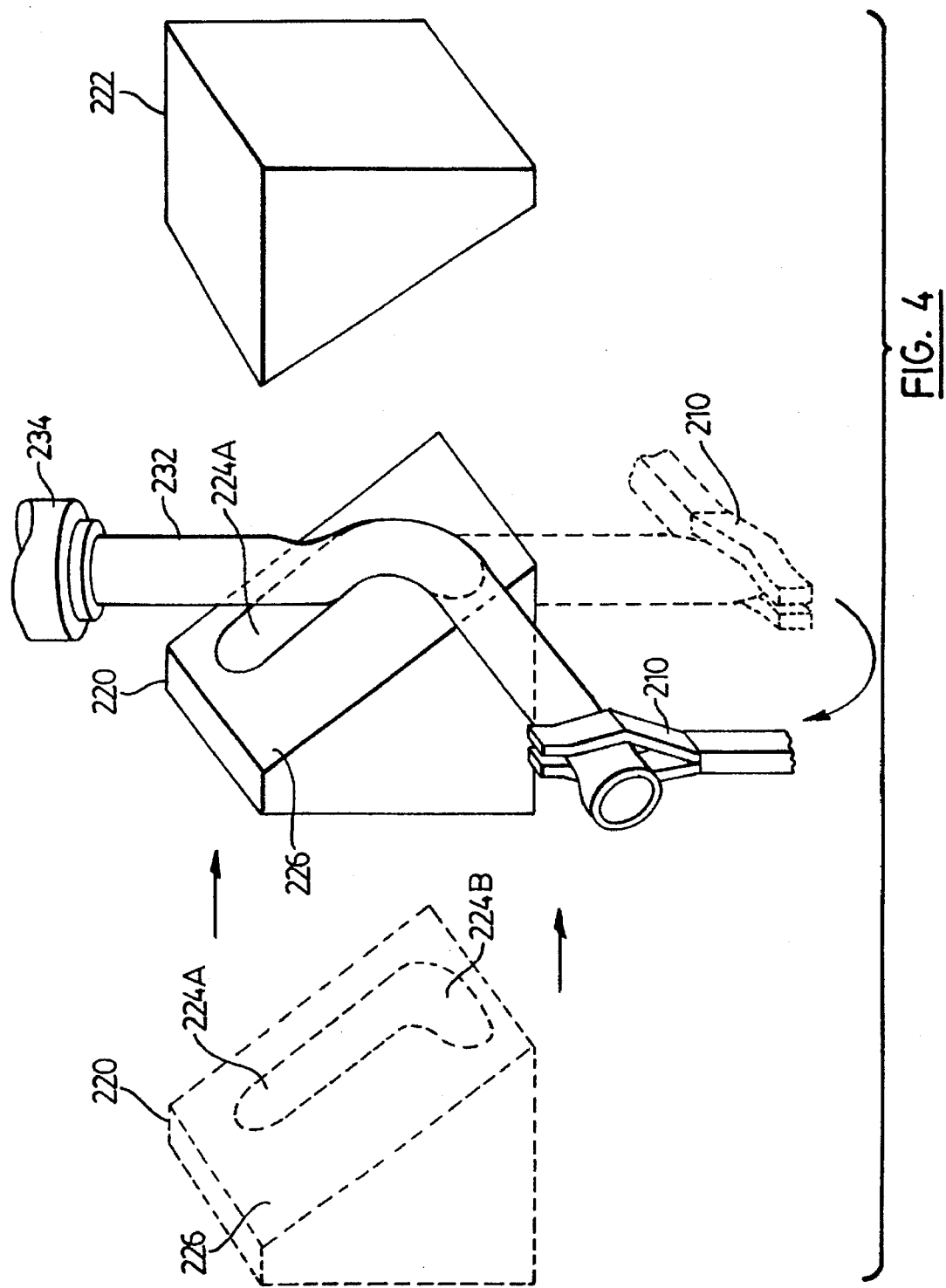
FIG. 4 illustrates another mold half which may be advantageously used under the embodiment of the invention shown in FIG. 2.

With reference to FIG. 1 it will be noted that the mold halves 10 and 12 illustrated therein are not necessarily simple single piece mold halves. As illustrated mold half 10 comprises an independently movable section 10B. Similarly mold half 12 includes an independently movable section 12B. Each of the independently movable sections 10B and 12B include internal control means 10C and 12C respectively for controlling the positioning of the independently movable portions. A mold such as that shown in FIG. 1 with independently movable sections may be particularly useful for manufacturing parts having the general configuration of a tube with an L-shaped leg. The part which would be manufactured in the molds such as shown in FIGS. 3 and 4 might most conveniently be manufactured in molds having independently movable sections such as illustrated in FIG. 1. With this type of configuration the mold halves 10 and 12.may be closed and positioned as desired so that the parison first overlies a portion of the mold cavity. The mold cavity 14A can then be closed by moving the mold halves 10 and 12 as desired. The parison may then be manipulated by means of manipulator 110 so that the parison is extended perpendicular to the plane of FIG. 1. With the parison then lying in a substantially horizontal configuration but perpendicular to the plane of FIG. 1, the parison would overlie the cavity portions 14B and the independent portions 10B and 12B may be closed to form the closed cavity. Upon final closure of the mold the part may be blow molded by introduction of gas under pressure.

The mold halves may be configured as shown in FIG. 1 wherein the parting face is substantially planar or as configured in FIG. 3 in which the parting face is not planar. In either case independently controlling the movement of the mold halves permits the parison to, be placed within the mold cavity regardless of the configuration of the mold cavity by means of the manipulation step. Thus with the parison substantially overlying the mold cavity and substantially only the mold cavity, the amount of flash may be reduced to the minimum required in the blow molding process given the configuration of the desired part.

Figure 2:
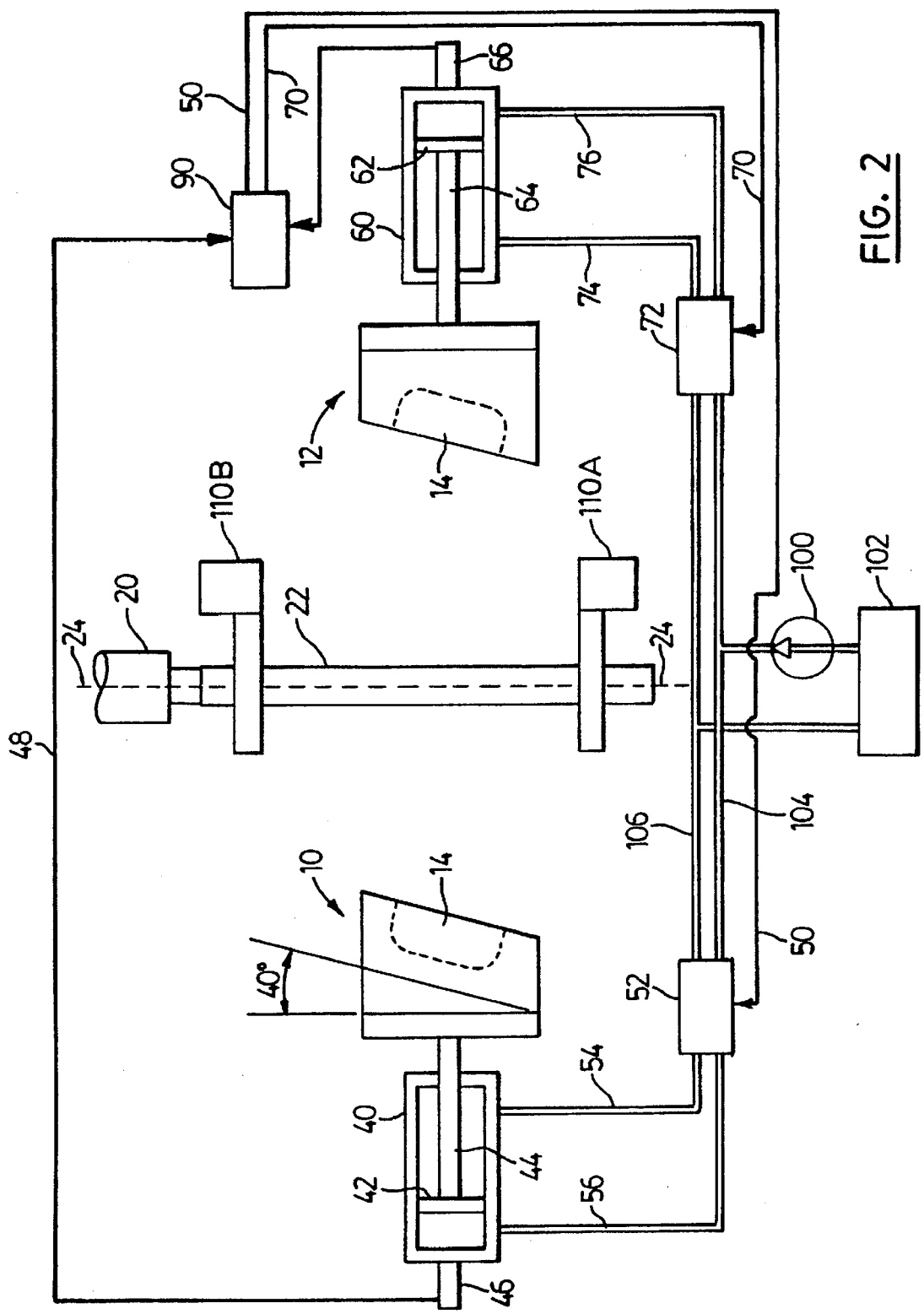
FIG. 2 is a second embodiment of the invention similar to FIG. 1, but in which the mold halves are modified.

The apparatus illustrated in FIG. 2 is substantially similar to that illustrated in FIG. 1. In each case similar parts have been given similar numbers. The major difference between the apparatus shown in FIG. 1 and the apparatus shown in FIG. 2 is the orientation of the parting face of the mold halves 10 and 12. As shown with respect to mold half 10, the parting face of mold half 10, is shown as being generally planar. The plane extends at an angle of approximately 40° from the vertical. As mold half 12 is a complimentary mold half to mold half 10 the parting face of mold half 12 also extends at an angle of 40° from the vertical.

The apparatus as shown in FIG. 2 includes manipulators positioned above and below the molds 10 and 12. Lower manipulator 110A enables manipulation of the bottom portion of the parison. Upper manipulator 110B permits the top of the parison to be manipulated.

The apparatus shown in FIG. 2 is particularly advantageous for use with the process of this invention. Typically, the mold half 14 would first be moved toward the extruded parison. The cavity in mold half 14 is substantially inclined at a 40° angle with respect to the general plane of reference 24. To this extent a portion of the parison 22 may first contact the lowermost portion of the mold cavity 14 within the mold half 12. As the mold half 12 moves toward the plane of reference the parison is directed sequentially into the mold cavity 14. When the parison is thus in contact with portions of the mold cavity 14 within mold half 12, the parison may be manipulated at either the top or bottom or both as desired to produce a more complex shaped part. Depending upon the particular nature of the part to be manufactured, the mold halves 10 and 12 as shown in FIG. 2 may be equipped with independently moving sections and/or portions having substantially raised projections from the parting face as shown in FIG. 3. When the parison has been substantially located with respect to mold half 12 then mold half 10 is independently brought towards mold half 12 to close the mold and produce the closed cavity.

FIG. 4 is a view similar to FIG. 3 and like numbers have been used with the prefix 2 rather than 1. FIG. 4 illustrates a mold 220. The initial position of the mold 220 is shown in broken lines with the final position of mold 220 shown in solid lines. The mold 220 has a mold cavity 224 which includes a first portion 224A and a second portion 224B. The mold half 220 has a parting face 226 which is substantially planar. The mold parting face 226 is sloped at an angle to the vertical of approximately 40° as shown in FIG. 2.

A nozzle 234 is used to extrude a parison 232 which hangs substantially vertically downwardly from the nozzle. After extrusion of the parison the mold half 220 is moved from the broken line position to the solid line position so that the parison overlies and becomes aligned with a portion of the cavity 224 of the mold 220. A manipulator 210 can grasp the lower portion of the parison 232 and then move through a 90° angle so as to align a portion of the parison 232 with the portion 224 of the mold cavity. Further alignment of the parison 232 with the upper portion 224 of the cavity is achieved by additional horizontal movement of the mold 220. Once the parison has thus been aligned and placed within the cavity by movement of mold 220, the complimentary mold 222 can then be moved so as to come into contact with parting face 226 thus closing the cavity 224. When the cavity 224 is closed the usual blow molding process can then take place to produce the finished part.

Figure 5B:
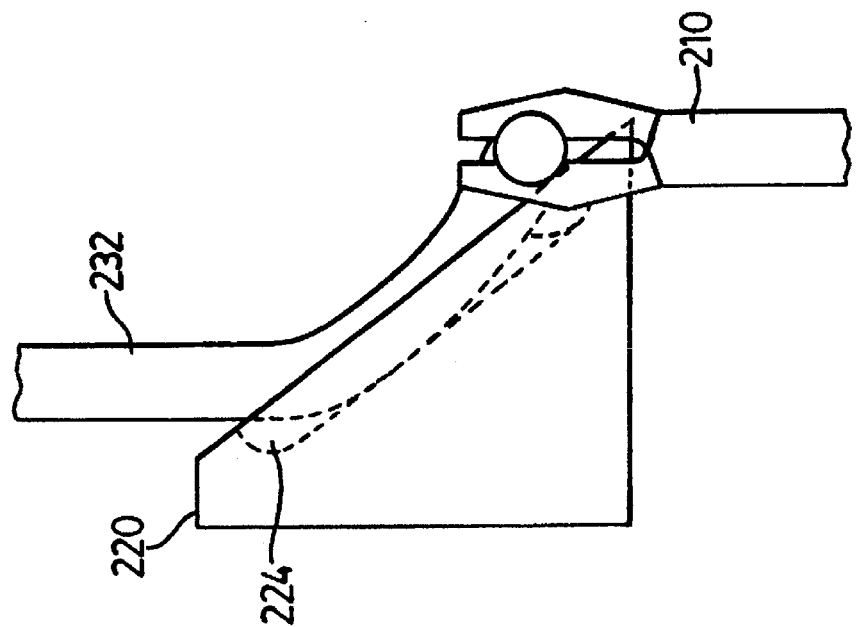
FIGS. 5A and 5B illustrate the mold half of FIG. 4 in a side view but utilizing an alternate process.
Figure 5A:
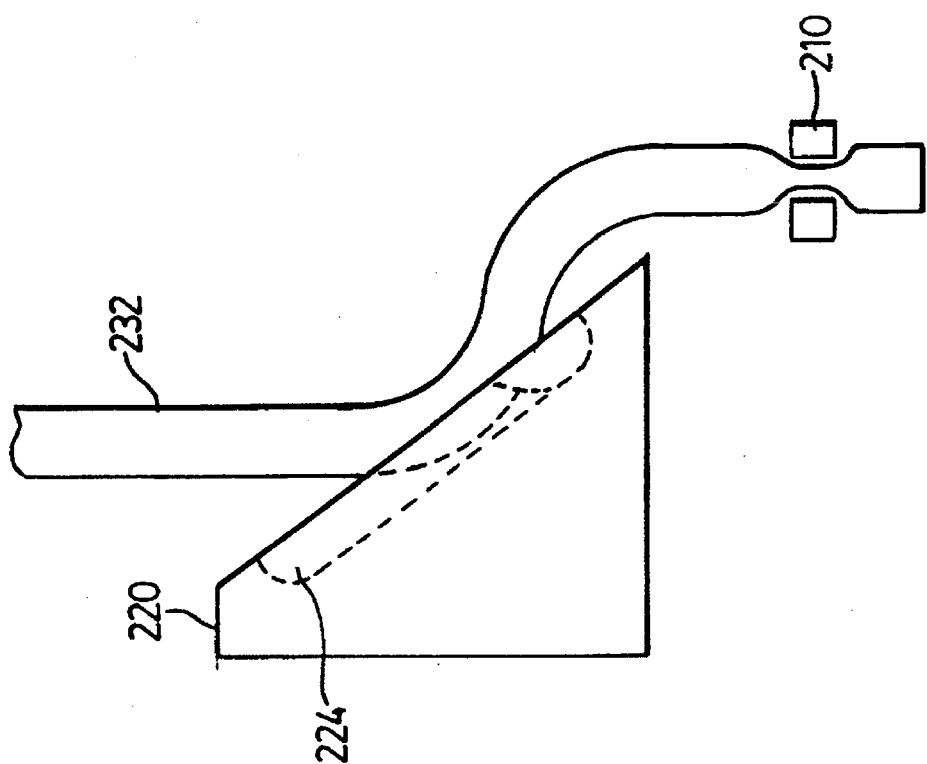

FIGS. 5A and 5B show the mold half 220 in a side view during steps of aligning the parison with the mold cavity 224. The same numerals have been used to identify identical parts in FIGS. 4 and 5. In FIG. 5A the mold half 220 is shown having been moved to a position where it underlies the extrusion head from which the parison 232 has been extruded. The process illustrated in FIGS. 5A and 5B is slightly different from that described in association with FIG. 4 in that the parison 232 has been grasped by a manipulator 210. When the manipulator first grasps the parison it will be located directly below the extrusion head as shown in dotted lines in FIG. 3. In the embodiment shown in FIG. 5 the manipulator is caused to move substantially horizontally to the right while the mold half 220 is independently brought toward the hanging parison. In the position shown in FIG. 5A the parison has become S-shaped under the combined action of the mold half 220 and the manipulator 210. As shown in FIG. 5A a portion of the parison 232 has settled into a portion of the cavity 224. As shown in FIG. 5B the remainder of the process involves the mold half 220 being advanced even further to the right so that the upper portion of the parison is laid in the remainder of the top portion of the mold cavity 224. At the same time the manipulator is brought upwardly to rotate the parison through a substantially 90° angle so that what was formerly the lower portion of the parison is then aligned with the lower horizontal section of the cavity 224 in the mold 220. When the parison has been positioned completely in the cavity 224 then the complimentary mold half is brought into contact with the mold half 220 to close the mold preparatory to the blow molding process.

By independently controlling the mold half locations, the designer may take advantage of mold portions having raised portions which serve to steer the parison into the cavity as discussed in connection with FIG. 4. In addition by using mold portions with independently moving sections and manipulator arms the parison may be manipulated as required to overlie or be placed in a cavity of virtually unlimited configuration. This is to be contrasted with situations in which the mold halves close synchronously towards the plane of reference 24. Thus, the independently controlled mold halves permit manufacture of relatively simple parts while at the same time facilitating the manufacture of much more complex configured parts while still utilizing the relatively simple low pressure blow molding process and equipment. Those familiar with the blow molding art will recognize that if a parison is manipulated at top and bottom, other access may be provided through the mold itself to provide an inlet for the pressurized gas which molds the parison to the surface of the cavity.

While an angle of 40° has been shown in FIG. 2, there is no limit to the angle that may be utilized bathe mold designer. For relatively simple parts a relatively small departure angle from vertical of only 5° or more may serve to align the parison with one mold half before final closure. Most preferably it has been found that for more complex parts, an angle of between 20° and 40° is desirable for aligning and placing a parison in a first mold half prior to completing the closure of the mold.

In both FIGS. 1 and 2 the mold halves are shown as moving in a substantially horizontal direction with the parison hanging in a substantially vertical direction. Where desired the mold halves may themselves move at an angle to the vertical. While it is simplest that the plane of reference be substantially vertical so that the parison may be extruded and hung from the nozzle under the effects of gravity, the independently moving mold halves need not close by moving in a horizontal direction. Rather than having a 40° angle on the parting face as discussed above, the mold halves could have substantially perpendicular parting faces and the direction of closure could be at an angle of 40° to the plane of reference. This would effectively achieve the same alignment of the parison with cavity 14. Such a machine would however then be custom manufactured for the part involved. The advantage of using horizontally moving mold portions is that the mold halves may be replaced and any number of parts, whether simple or complicated, manufactured in the same machine.

Figure 6:
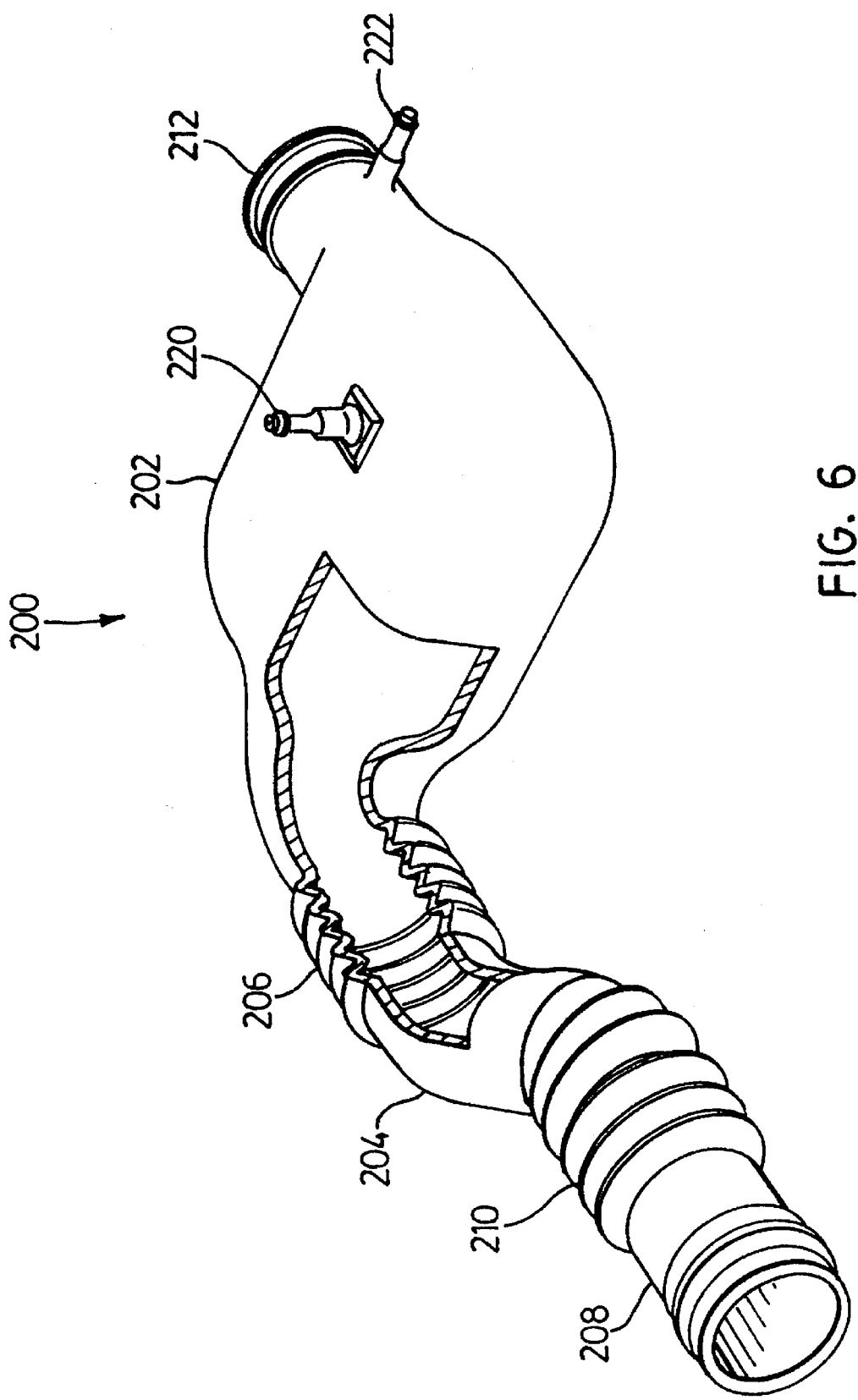
FIG. 6 illustrates a molded part.

FIG. 6 illustrates a relatively complicated part that may be manufactured using the process of this invention. The part illustrated in FIG. 6 is an automotive part shown generally as 200. The part comprises a resonator body 202 and an elbow portion 204. The part also includes a central bellows section 206, a gas flow entrance end 208 including a further bellows 210 and a gas flow exit 212. The configuration of the part 200 is complicated and thus requires a relatively complicated mold. The part may be manufactured in a mold using the process described herein by manipulating the parison to overlie the mold halves and then blow molding the part once the parison has been aligned with the mold cavity. Of particular utility is the fact that the part 200 may be manufactured from two compatible but quite different plastics. The part 200 comprises two parts, that is the resonator body 202 and the elbow portion 204 which are manufactured from a hard plastic. The central bellows section 206, the sized entrance end 208 with bellows 210 and the sized exit 212 may all be made from a relatively flexible plastic. The part thus comprises a soft, hard, soft combination, yet can be manufactured in a single blow molding process. The soft, hard, soft extrusion process provides savings in the form of reduced assembly costs, lower weight and fewer component assemblies. The soft, hard, soft product is achieved using a co-extrusion process which allows the wall thickness of either the soft or hard material to be varied from zero to 100% of the total wall thickness of the parison. Any two compatible materials may be used. The net result is a finished part with both soft, flexible sections and rigid sections.

Examples of apparatus for extruding two different plastics from a single nozzle forming a parison having two different materials are illustrated in patents to Excel Corporation, U.S. Pat. No. 4,907,957 issued Mar. 13, 1990 and U.S. Pat. No. 4,659,531 issued Apr. 21, 1987. A laminated parison is also disclosed in U.S. Pat. No. 5,004,578 issued Apr. 2, 1991 to Drupp Kautex Maschinenbou GmbH.

To further illustrate the flexibility of that parts that may be manufactured successfully using this process, the part 200 may be fitted with additional inserts such as an injection molded insert 220 or a molded in soft nozzle portion 222. The injection molded insert 220 may be manufactured in a separate operation and then placed within the mold for incorporation in the blow molded product.

While a particular product has been illustrated it will be apparent that there is a great flexibility in the geometric configuration of products that may be made using the process described herein.

The above description is intended in an illustrative rather than a restrictive sense, and variations to the specific apparatus and process described may be apparent to skilled persons in adapting the present invention to specific applications. Such variations are intended to form part of the present invention insofar as they are within the spirit and scope of the claims below.

We claim:

1. A process for making a blow molded product comprising:
   i) extruding a parison from an extrusion head so that said parison hangs from said extrusion head substantially vertically and substantially between first and second complimentary mold halves;
   ii) independently controlling first and second complimentary mold halves;
   iii) moving one of said mold halves independently of the other of said mold halves, toward the other of said mold halves from a mold open position toward a mold closed position until at least a portion of said mold half is in contact with a portion of said parison;
   iv) grasping at least one first portion of said parison in a manipulator and manipulating said portion of said parison after a second portion of said parison is contacted by one of said mold halves said manipulation step occurring before blow moulding said product and said manipulation of said parison being in a direction other than a direction in or parallel to the vertical plane containing the direction of mold closure;
   v) closing said mold halves over said parison to create a closed mold, and
   vi) blow molding said product in said closed mold.

2. The process of claim 1 further including providing in each said mold half at least one independently movable section and further including the step of closing said independently movable sections and said mold halves sequentially.

3. The process of claim 2 wherein the bottom of said parison is manipulated before final closure of the mold.

4. The process of claim 2 wherein the top of said parison is manipulated before final closure of said mold.

5. The process of claim 3 wherein the top of said parison is manipulated before final closure of said mold.

6. The process of claim 1 further including the step of providing a first mold half having a portion of a mold cavity therein, said mold half having a parting face, said parting face comprising at least one projecting surface thereon adjacent said mold cavity.

7. The process of claim 6 further including the step of moving said first mold half toward a closed position so that said parison contacts said mold cavity remote from said projecting surface.

8. The process of claim 7 further comprising the step of manipulating said parison after said parison first contacts said mold cavity to guide said parison by means of said projecting surface into at least a portion of said mold cavity.

9. The process of claim 8 including providing each said mold half with at least one independently moveable section and further including the step of closing said independently moveable section of said mold half after said manipulation of said parison.

10. The process of claim 1 including providing a separate hydraulic cylinder and piston to move each said mold half, and a control valve for each said hydraulic cylinder and piston, and supplying hydraulic fluid under pressure to each said control valve, and controlling each said control valve by means of a programmable controller.

11. The process of claim 10 further including generating a signal indicative of the location of each said hydraulic piston and feeding each said piston location signal to said programmable controller.

12. The process of claim 1 further comprising moving each mold half from an open position to a closed position in a generally horizontal direction.

13. The process of claim 1 further comprising providing each mold half with a parting face which is generally planar, and said planar face is at an angle to the vertical.

14. The process of claim 13 wherein said angle is about 40°.

15. The process of claim 1 further comprising the step of extruding a parison from two thermoplastic resins, one resin setting to form a hard substantially inflexible molded portion and one resin setting to form a flexible molded portion.

16. The process of claim 2 wherein said process comprises closing said mold halves so that the parting faces of a portion of said mould halves are in contact with one another, and then manipulating said parison in the region of said independently movable sections, then completely closing said mould by moving said independently movable sections and then blow molding said product.

17. A process according to claim 1 wherein said product is generally tubular and comprises at least three portions, each portion having a general axis, each portion separated from an adjacent portion by a curve in said tubular product so that the axis of adjacent portions form an angle, the axis of one said portion forming an angle with a plane containing the other two axes.

18. A process for making a blow molded product comprising:
   i) extruding a parison from an extrusion head so that said parison hangs from said extrusion head substantially vertically;
   ii) independently controlling first and second complimentary mold halves;
   iii) moving one of said mold halves independently of the other of said mold halves, toward the other of said mold halves from a mold open position toward a mold closed position;
   iv) grasping at least one first portion of said parison in a manipulator and manipulating said portion of said parison after a second portion of said parison is contacted by one of said mold halves said manipulation step occurring before blow moulding said product and said manipulation of said parison being in a direction other than the direction of mold closure;
   v) closing said mold halves over said parison to create a closed mold, and
   vi) blow molding said product in said closed mold and wherein said process further includes providing in each said mold half, at least one independently movable section and said process further comprises closing said mold halves so that the parting faces of said mold halves are in contact with one another, and then manipulating said parison in the region of said independently movable sections, then completely closing said mold by moving said independently movable sections and then blow molding said product.

* * * * *